United States Patent
Sen

(10) Patent No.: US 11,276,518 B2
(45) Date of Patent: Mar. 15, 2022

(54) HAPTIC ENGINE MODULE WITH ARRAY-RIDDLED-OF-DUAL (AROD) MAGNETS

(71) Applicant: Apple Inc., Cupertino, CA (US)

(72) Inventor: Yi-Heng Sen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 359 days.

(21) Appl. No.: 16/565,392

(22) Filed: Sep. 9, 2019

(65) Prior Publication Data

US 2021/0074460 A1   Mar. 11, 2021

(51) Int. Cl.
| | | |
|---|---|---|
| *G08B 6/00* | (2006.01) | |
| *H01F 7/08* | (2006.01) | |
| *G06F 1/16* | (2006.01) | |
| *H01F 7/06* | (2006.01) | |

(52) U.S. Cl.
CPC .......... *H01F 7/081* (2013.01); *G06F 1/1662* (2013.01); *H01F 7/064* (2013.01)

(58) Field of Classification Search
None
See application file for complete search history.

(56) References Cited

U.S. PATENT DOCUMENTS

| | | | |
|---|---|---|---|
| 8,981,682 B2 | 3/2015 | Delson et al. | |
| 9,942,663 B1 | 4/2018 | Salvatti et al. | |
| 10,069,392 B2 | 9/2018 | Degner et al. | |
| 10,158,277 B2 | 12/2018 | Chun | |
| 10,277,154 B2 | 4/2019 | Hajati et al. | |
| 10,404,149 B2 | 9/2019 | Khoshkava et al. | |
| 10,510,224 B2 * | 12/2019 | Sen .................. | H02K 33/00 |
| 10,613,678 B1 * | 4/2020 | Sen .................. | G06F 3/046 |
| 10,694,014 B2 * | 6/2020 | Harrison .......... | G05B 9/02 |
| 10,802,592 B2 * | 10/2020 | Harrison .......... | G06F 3/046 |
| 2019/0079583 A1 | 3/2019 | Alghooneh et al. | |

* cited by examiner

*Primary Examiner* — Stephen W Jackson
(74) *Attorney, Agent, or Firm* — Fish & Richardson P.C.

(57) ABSTRACT

Embodiments are disclosed for a haptic engine module that includes AROD magnets. The AROD magnets comprise two adjacent magnets with opposite polarization and adjacent coils above and/or below the magnets. The magnets and coils are adjacent in along direction, which is the direction that is perpendicular to the vibration direction (the direction of the Lorentz force) and to the polarization direction (the direction of magnetic flux). When in operation, excitation current flows in the two coils in opposite directions. The haptic engine module can be embedded in an electronic device with an extreme aspect ratio (e.g., a touch bar of a notebook computer) to provide haptic force (e.g., vibration, click) that can be felt by a user holding or touching the electronic device.

17 Claims, 4 Drawing Sheets

HAPTIC ENGINE MODULE WITH ARRAY-RIDDLED-OF-DUAL (AROD) MAGNETS

TECHNICAL FIELD

This disclosure relates generally to electromagnetic actuators.

BACKGROUND

Electromagnetic actuator technology is widely adopted in a variety of electronic devices (e.g., smartphones, smartwatches, notebook computers, track pads, touch bars). A haptic engine module using electromagnetic actuator technology generates a Lorentz force when magnetic flux is projected perpendicular to a coil. When the haptic engine module has an extreme aspect ratio, such as long and thin, the conventional design methodology is to extend the coil and its corresponding magnet in the long direction up to the ends of the housing. This approach, while straightforward, reduces the contribution of magnetic flux to the Lorentz force due to the impact of different magnetic circuits on the magnetic field distribution.

SUMMARY

Embodiments are disclosed for a haptic engine module that includes AROD magnets. The AROD magnets comprise two adjacent magnets with opposite polarization and adjacent coils above and/or below the magnets. The magnets and coils are adjacent in a long direction, which is the direction that is perpendicular to the vibration direction (the direction of the Lorentz force) and to the polarization direction (the direction of magnetic flux). When in operation, excitation current flows in the two coils in opposite directions. The haptic engine module can be embedded in an electronic device with an extreme aspect ratio (e.g., a touch bar of a notebook computer) to provide haptic force (e.g., vibration, click) that can be felt by a user holding or touching the electronic device.

In an embodiment, a haptic engine module comprises: a housing; a first coil disposed in the housing, the first coil extending in a first direction; a second coil disposed in the housing adjacent the first coil in the first direction; a proof-mass disposed in the housing proximate to the first and second coils, the proof-mass configured to move within the housing in a second direction perpendicular to the first direction in response to a Lorentz force generated by a magnetic field caused by excitation current flowing in opposite directions in the first and second coils; a first magnet disposed on or in the proof-mass and having a first magnetic polarization, the first magnet arranged relative to the first and second coils such that a first magnetic flux of the first magnet is projected onto the first and second coils; and a second magnet disposed on or in the proof-mass and having a second magnetic polarization opposite the first magnetic polarization, the second magnet adjacent the first magnet in the first direction, the second magnet arranged relative to the first and second coils such that a second magnetic flux of the second magnet is projected onto the first and second coils.

In an embodiment, an electronic device comprises: a touch bar having a touch bar area for providing haptic feedback to user; one or more haptic engine modules located at least partially under the touch bar area, each haptic engine module comprising: a housing; a first coil disposed in the housing, the first coil extending in a first direction; a second coil disposed in the housing adjacent the first coil in the first direction; a proof-mass disposed in the housing proximate to the first and second coils, the proof-mass configured to move within the housing in a second direction perpendicular to the first direction in response to a Lorentz force generated by a magnetic field caused by excitation current flowing in opposite directions in the first and second coils; a first magnet disposed on or in the proof-mass and having a first magnetic polarization, the first magnet arranged relative to the first and second coils such that a first magnetic flux of the first magnet is projected onto the first and second coils; and a second magnet disposed on or in the proof-mass and having a second magnetic polarization opposite the first magnetic polarization, the second magnet adjacent the first magnet in the first direction, the second magnet arranged relative to the first and second coils such that a second magnetic flux of the second magnet is projected onto the first and second coils; a driver coupled to the haptic engine module and configured to provide drive signals to the haptic engine module in response to a control signal or command, the drive signals for moving the proof-mass within the housing; and a controller configured to generate the control signal or command.

One or more of the disclosed embodiments provide one or more of the following advantages. The disclosed haptic engine module with AROD magnets can be included in a housing with an extreme aspect ratio (e.g., long and thin dimensions) and provide an increased Lorentz force, increased demagnetization temperature for the magnets and improved magnet manufacturability when compared with other haptic engine module designs.

The details of one or more implementations of the subject matter are set forth in the accompanying drawings and the description below. Other features, aspects and advantages of the subject matter will become apparent from the description, the drawings and the claims.

DETAILED DESCRIPTION

Figure 1:
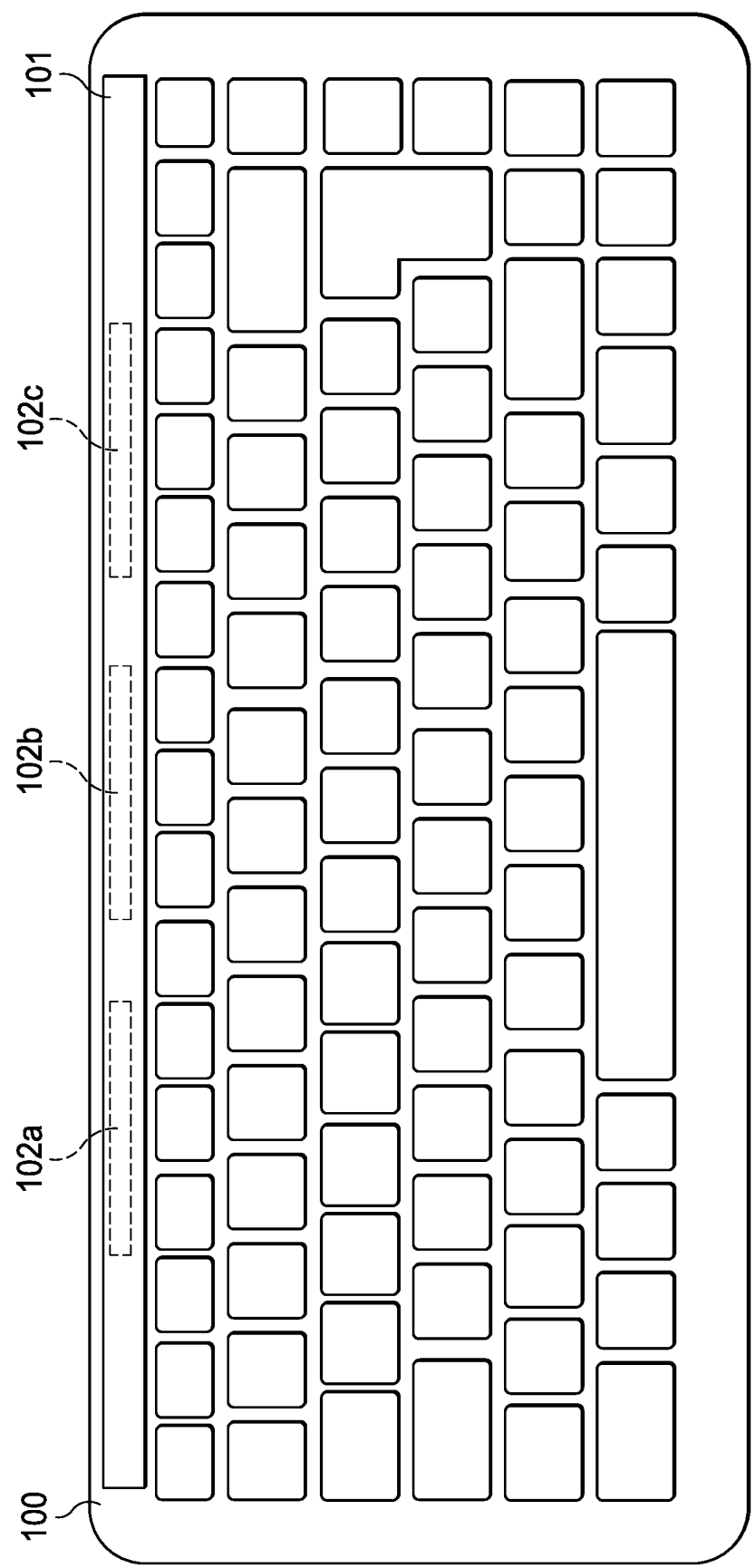
FIG. 1 shows a keyboard for a notebook computer that includes a touch bar with haptic engine modules having extreme aspect ratios, according to an embodiment.

FIG. 1 shows keyboard 100 for a notebook computer or other electronic device that includes touch bar area 101 and haptic engine modules 102a . . . 102c embedded under touch bar area 101. Due to the dimensions of touch bar area 101, each haptic engine module 102a . . . 102c has an extreme aspect ratio to fit within the touch bar area 101. Each haptic engine module 102a-102c comprises a long coil and magnet extending in the long direction. In this configuration, the magnet will experience self-demagnetization when projecting magnetic flux onto the coil. The self-demagnetization will result in reduced magnetic flux and therefore reduced Lorentz force, as described in reference to FIGS. 2A-2C.

Single Magnet and Coil Design

Figure 2A:
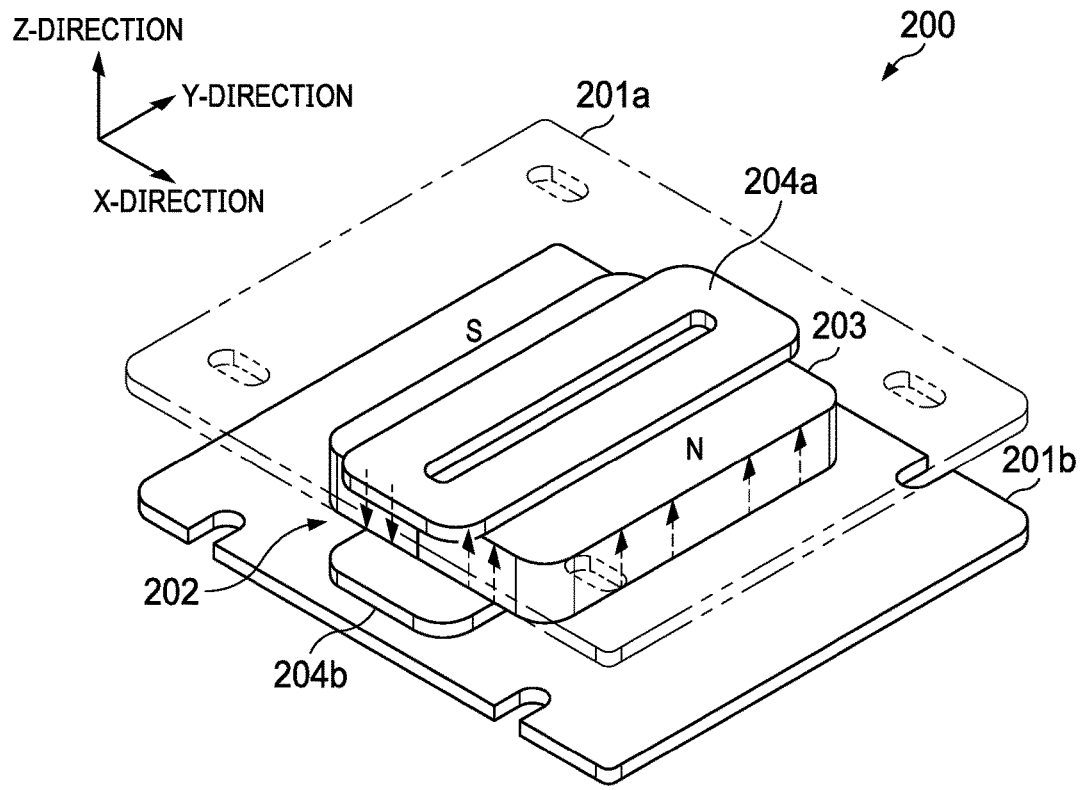
FIG. 2A is a perspective view of a prior art haptic engine module with a long y-direction.

FIG. 2A is a perspective view of a prior art haptic engine module 200 with a long y-direction. The x-direction is perpendicular to the y-direction and is the direction in which the proof-mass moves (e.g., the vibration direction). The z-direction is the polarization direction and is perpendicular to the x and y directions using the right-hand rule. Haptic engine module 200 includes upper housing surface 201a and lower housing surface 201b. The sides of the housing are removed to expose the internal structures of haptic engine module 200. In practice, haptic engine module 200 has a completely enclosed housing. A proof-mass 202 is fixed to the housing by springs or other mechanically compliant structures to allow proof-mass 202 to move in the vibration direction (x-direction) when coil 204a, 204b are excited with current. Proof-mass 202 comprises a signal magnet 203 with North and South poles, as shown in FIG. 2A. When coils 204a, 204b are excited with current, coils 204a, 204b generate a magnetic field which generates magnetic flux that is projected by magnet 203 on coils 204a, 204b. The magnetic flux creates a Lorentz force in the vibration direction. Changing the direction of the current in coils 204a, 204b causes proof-mass 202 to vibrate.

Figure 2B:
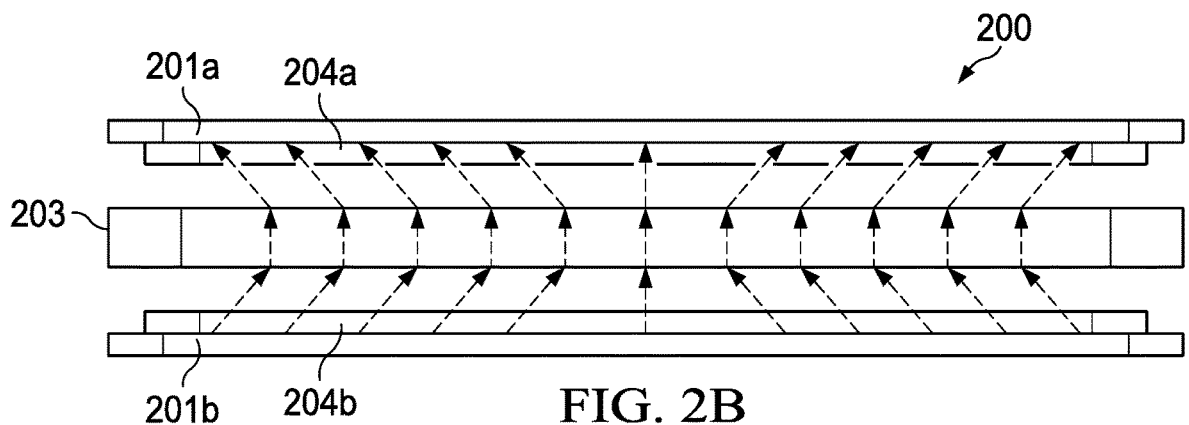
FIG. 2B is a side view of the haptic engine module of FIG. 1 looking perpendicular to the y-direction and showing the magnetic flux direction.

FIG. 2B is a side view of haptic engine module 200 of FIG. 1, looking perpendicular along the y-direction and showing the magnetic flux flow. When the surface aspect ratio of magnet 204 increases two magnetic effects work against each other: magnet self-demagnetization and increased magnetic flux. As the aspect ratio of haptic engine module 200 becomes extreme (the y-direction is much longer than the x-direction), the magnetic flux projected onto coil 204 by magnet 203 decreases, resulting in a decrease in Lorentz force. Note that in the embodiment shown there are coils 204a, 204b above and below magnet 203, respectively.

Figure 2C:
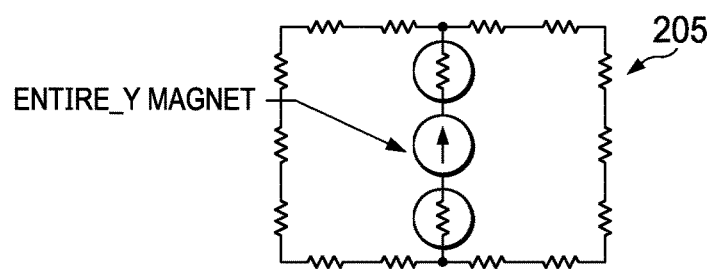
FIG. 2C is a schematic diagram of an equivalent circuit for the haptic engine module shown in FIGS. 2A and 2B.

FIG. 2C is a schematic diagram of equivalent circuit 205 for haptic engine module 200 shown in FIGS. 2A and 2B. Equivalent circuit 205 has a single magnetic field source provided by single magnet 203 ("Entire_Y_magnet") with the magnetic flux being split into two directions. This inefficient design is the result of the dimensional ratio of the magnet and the desire to maximize the coil plus magnet footprint in the y-direction. Using a FEA ANSYS Maxwell simulation of the haptic engine module 200, the average magnetic flux ("B-flux") projected onto coils 204a, 204b by magnet 203 is approximately 0.55 Tesla.

AROD Magnets

Figure 3A:
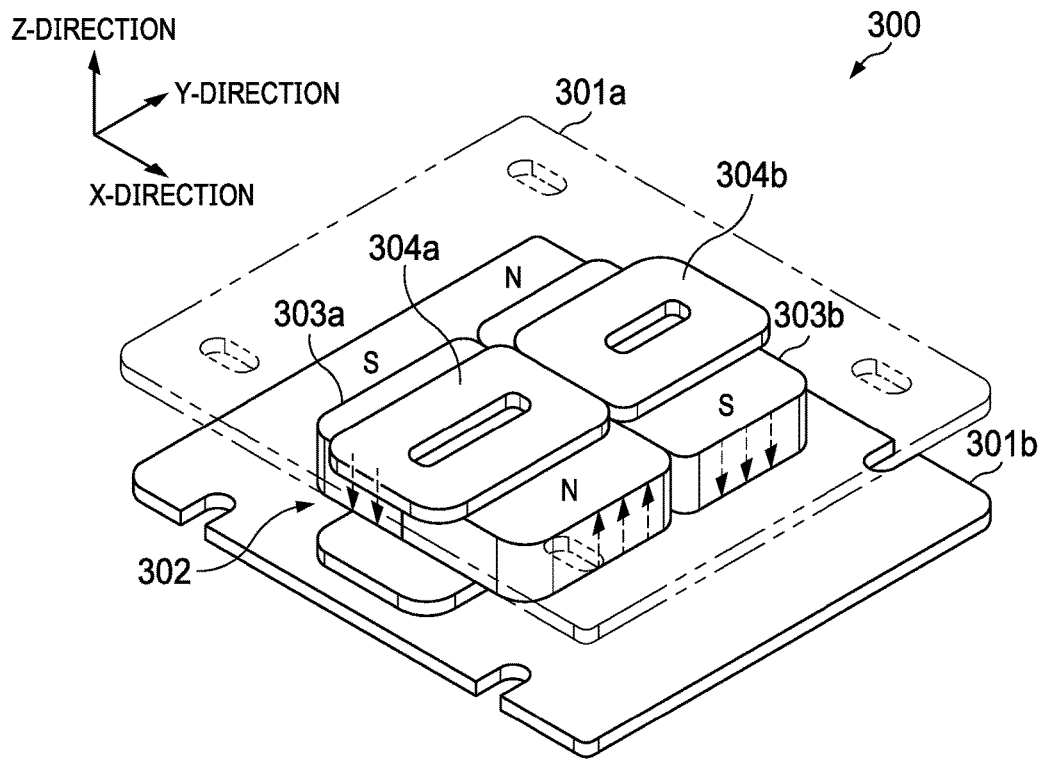
FIG. 3A is a perspective view of a haptic engine module with AROD magnets, according to an embodiment.

FIG. 3A is a perspective view of haptic engine module 300 with AROD magnets, according to an embodiment. The vibration direction (x-direction) is perpendicular to the y-direction. The z-direction is the polarization direction and is perpendicular to the x and y directions applying the right-hand rule. Haptic engine module 300 includes upper housing surface 301a and lower housing surface 301b. The sides of the housing are removed to expose the internal structures of haptic engine module 300. In practice, haptic engine module 300 is completely enclosed within the housing, such that a proof-mass 302 can move in the x-dimension when coils 304a, 304b are excited with current.

Haptic engine module 300 includes dual magnets 303a, 303b having opposite magnetic polarization. Each of magnets 303a, 303b has a North pole and a South pole. The North pole of magnet 303a is adjacent to the South pole of magnet 303b and the South pole of magnetic 303a is adjacent to the North pole of magnet 303b. Coils 304a, 304b are disposed above and below the magnets 303a 303b. When coils 304a, 304b are excited with current in opposite directions, coils 304a, 304b generate magnetic fields which cause magnets 303a, 303b, to generate magnetic fluxes that are projected on to coils 304a, 304b, respectively. The magnetic fluxes create a Lorentz force in the vibration direction (x-direction). Changing the direction of the current in coils 304a, 304b causes the proof-mass 302 to vibrate. In an embodiment magnets 303a, 303b are made of the same material (e.g., N48SH).

Figure 3B:
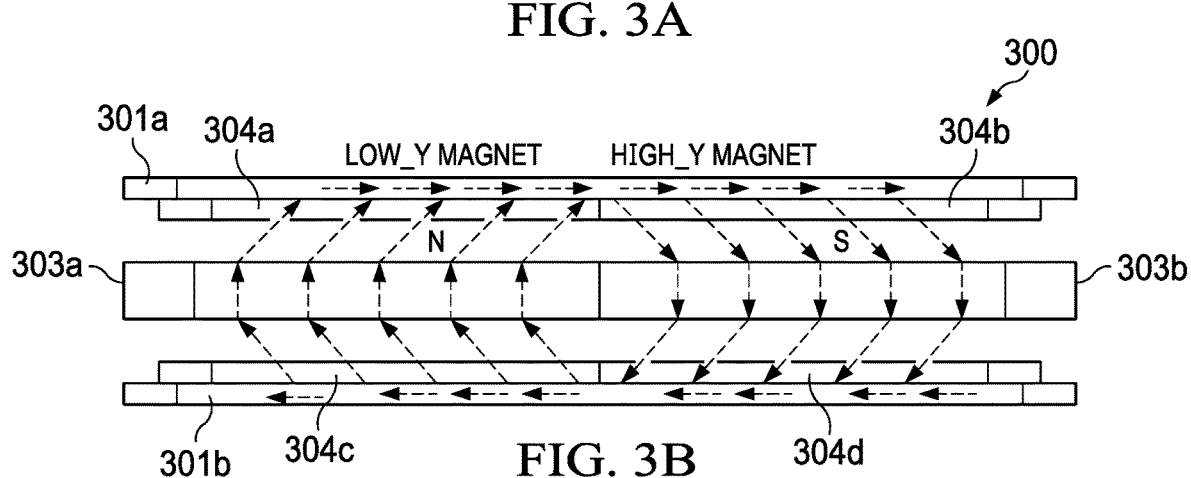
FIG. 3B is a side view of the AROD haptic engine module of FIG. 1 looking perpendicular to the y-direction and showing the magnetic flux direction, according to an embodiment.

FIG. 3B is a side view of the haptic engine module 300 of FIG. 1 looking perpendicular to the y-direction and showing magnetic flux flow, according to an embodiment. In haptic engine module 300, magnets 303a (Low_Y magnet), 303b (High_Y magnet) are arranged relative to coils 304a, 304b to maximize the magnetic flux projected onto coils 304a, 304b. Note that in the embodiment shown there are coils 304a, 304b above magnets 303a, 303b, and coils 304c, 304d below magnets 303a, 303b.

Figure 3C:
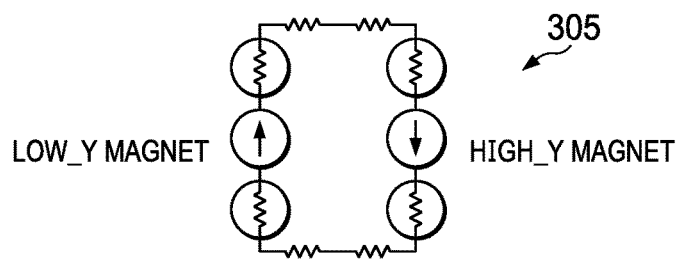
FIG. 3C is a schematic diagram of an equivalent circuit for the haptic engine module shown in FIGS. 3A and 3B, according to an embodiment.

FIG. 3C is a schematic diagram of equivalent circuit 305 for haptic engine module 300 shown in FIGS. 3A and 3B, according to an embodiment. Equivalent circuit 305 has two magnetic field sources adding B-flux onto both coils 304a, 304b. To enhance the Lorentz forces acting in the same direction, the 1x long coils 204a, 204b shown in FIG. 2A are each split into 2x smaller coils 304a, 304b and 304c, 304d, respectively. Based on a FEA ANSYS Maxwell simulation of haptic engine module 300, the average B-flux projected onto coils 304a . . . 304d by magnets 303a, 303b, respectively is approximately 0.61 Tesla, which is 10% larger than the magnetic flux projected by magnet 203 onto coils 204a, 204b in haptic engine module 200. With haptic engine module 300, the magnetic flux on magnet 303a is increased by magnet 303b, and the magnetic flux on magnet 303b is increased by magnet 303a. Also, the less extreme aspect ratio of the magnets 303a, 303b (due to splitting a signal long magnet and coil into two shorter magnets and two coils), results in higher permeance coefficients for magnets 303a, 303b, higher B-flux, higher Curie temperature and higher magnet de-magnetization temperature.

Example Control Systems

Figure 4:
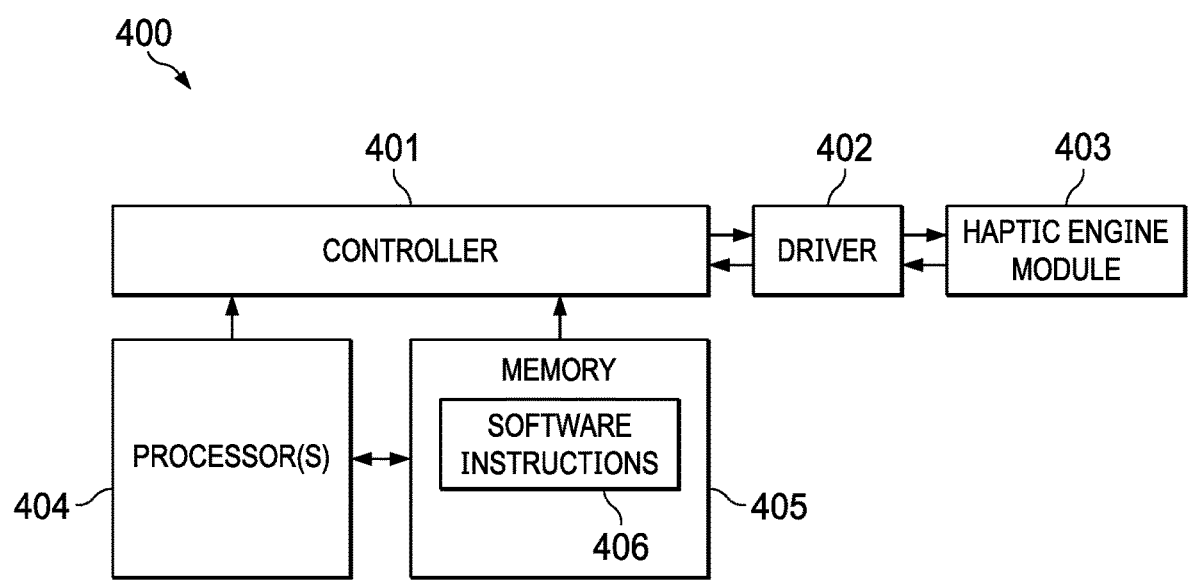
FIG. 4 is a block diagram of a control system for the haptic engine module shown in FIGS. 3A-3C, according to an embodiment.

FIG. 4 is a block diagram of control system 400 for haptic engine module 300 shown in FIGS. 3A-3C, according to an embodiment. Control system 400 includes controller 401, driver 402, haptic engine module 403, processor 404, memory 405 and software instructions 406. Controller 401 can be configured to command driver 402 to provide a drive signal to control the motion of a proof-mass in haptic engine module 403. Memory 405 includes software instructions 406 executed by controller 401 and/or processor 402 to control the vibration of the proof-mass in haptic engine module 403.

In a first embodiment of control system 400, memory 405 includes software instructions 406 to implement open loop control of haptic engine module 403. In a second embodiment of control system 400, memory 405 includes software instructions 406 to implement velocity sensing, closed-loop control of haptic engine module 403. In the second embodiment, controller 401 receives back-electromotive force (back-EMF) voltage measurements at the coil terminals to be used by a closed-loop control law to generate and send control signals or commands to haptic engine module 403. In a third embodiment of control system 400, memory 405 includes software instructions 406 to implement position sensing, closed-loop control of haptic engine module 403. In the third embodiment, controller 401 receives position data from one or more magnetic sensors (e.g., one or more Hall sensors), or a position indicating magnet located on the proof-mass. The magnetic sensors can be attached to the housing to measure the position of magnets 303*a*, 303*b*. In a fourth embodiment of control system 400, memory 405 includes software instructions 406 to implement position and velocity sensing, closed-loop control of haptic engine module 403. In this fourth embodiment, controller 401 receives back-EMF voltage measurements at the coil terminals and position data from one more magnetic sensors (e.g., Hall sensors) and uses the voltage measurements and position data with a closed-loop control law to generate and send control commands to driver 402.

In an embodiment, an example closed-loop control system 400 suitable for controlling haptic engine module 300 is described U.S. Pat. No. 10,277,154 for "Closed-Loop Control of Linear Resonant Actuator Using Back-EMF data and Hall Sensing," issued, which patent is incorporated by reference herein in its entirety.

What is claimed is:

1. A haptic engine module, comprising:
a housing;
a first coil disposed in the housing, the first coil extending in a first direction;
a second coil disposed in the housing adjacent the first coil in the first direction;
a proof-mass disposed in the housing proximate to the first and second coils, the proof-mass configured to move within the housing in a second direction perpendicular to the first direction in response to a Lorentz force generated by a magnetic field caused by excitation current flowing in opposite directions in the first and second coils;
a first magnet disposed on or in the proof-mass and having a first magnetic polarization, the first magnet arranged relative to the first and second coils such that a first magnetic flux of the first magnet is projected onto the first and second coils; and
a second magnet disposed on or in the proof-mass and having a second magnetic polarization opposite the first magnetic polarization, the second magnet adjacent the first magnet in the first direction, the second magnet arranged relative to the first and second coils such that a second magnetic flux of the second magnet is projected onto the first and second coils.

2. The haptic engine module of claim 1, wherein the first magnet and the second magnet each have a North and South pole, and the North pole of the first magnet is adjacent the South pole of the second magnet, and the South pole of the first magnet is adjacent to the North pole of the second magnet.

3. The haptic engine module of claim 1, wherein the first and second magnets are made from a same material.

4. The haptic engine module of claim 1, further comprising:
a third coil disposed in the housing, the third coil extending in the first direction; and
a fourth coil disposed in the housing adjacent the third coil in the first direction, wherein the first coil is located above the first magnet, the second coil is located above the second magnet, the third coil is located below the first magnet and the fourth coil is located below the second magnet.

5. An electronic device, comprising:
a touch bar having a touch bar area for providing haptic feedback to user;
one or more haptic engine modules located at least partially under the touch bar area, each haptic engine module comprising:
a housing;
a first coil disposed in the housing, the first coil extending in a first direction;
a second coil disposed in the housing adjacent the first coil in the first direction;
a proof-mass disposed in the housing proximate to the first and second coils, the proof-mass configured to move within the housing in a second direction perpendicular to the first direction in response to a Lorentz force generated by a magnetic field caused by excitation current flowing in opposite directions in the first and second coils;
a first magnet disposed on or in the proof-mass and having a first magnetic polarization, the first magnet arranged relative to the first and second coils such that a first magnetic flux of the first magnet is projected onto the first and second coils; and
a second magnet disposed on or in the proof-mass and having a second magnetic polarization opposite the first magnetic polarization, the second magnet adjacent the first magnet in the first direction, the second magnet arranged relative to the first and second coils such that a second magnetic flux of the second magnet is projected onto the first and second coils;
a driver coupled to the haptic engine module and configured to provide drive signals to the haptic engine module in response to a control signal or command, the drive signals for moving the proof-mass within the housing; and
a controller configured to generate the control signal or command.

6. The electronic device of claim 5, wherein the first magnet and the second magnet each have a North and South pole, and the North pole of the first magnet is adjacent the South pole of the second magnet, and the South pole of the first magnet is adjacent to the North pole of the second magnet.

7. The electronic device of claim 5, wherein the first and second magnets are made from a same material.

8. The electronic device of claim 5, further comprising:
a third coil disposed in the housing, the third coil extending in the first direction; and
a fourth coil disposed in the housing adjacent the third coil in the first direction, wherein the first coil is located above the first magnet, the second coil is located above the second magnet, the third coil is located below the first magnet and the fourth coil is located below the second magnet.

9. The electronic device of claim 5, further comprising:
one or more processors;
a memory storing instructions that when executed by the one or more processors cause the one or more processors to perform operations comprising:

commanding the controller to operate the haptic engine module.

10. The electronic device of claim 9, wherein the memory stores instructions to implement open loop control of haptic engine module.

11. The electronic device of claim 9, wherein the memory stores instructions to implement velocity sensing, closed-loop control of haptic engine module.

12. The electronic device of claim 11, wherein the controller receives back-electromotive force voltage measurements at terminals of the first and second coils to be used by a closed-loop control law to generate and send control signals or commands to the driver.

13. The electronic device of claim 9, wherein the memory stores instructions to implement position sensing, closed-loop control of haptic engine module.

14. The electronic device of claim 13, wherein the controller receives position data from one or more magnetic sensors, or a position indicating magnet located on the proof-mass.

15. The electronic device of claim 9, wherein the memory includes instructions to implement position and velocity sensing, closed-loop control of haptic engine module.

16. The electronic device of claim 15, wherein the controller receives back-electromotive force voltage measurements at terminals of the first and second coils and position data from one more magnetic sensors in the haptic engine module and uses the position data with a closed-loop control law to generate and send control commands to the driver.

17. The electronic device of claim 5, wherein the electronic device is a notebook computer.

* * * * *